United States Patent
Kee

(10) Patent No.: US 8,578,463 B2
(45) Date of Patent: Nov. 5, 2013

(54) METHOD OF COLLABORATIVE COMPUTING

(75) Inventor: Howard Kee, Brambleton, VA (US)

(73) Assignee: BAE Systems Information Solutions Inc., Arlington, VA (US)

( * ) Notice: Subject to any disclaimer, the term of this patent is extended or adjusted under 35 U.S.C. 154(b) by 0 days.

(21) Appl. No.: 13/513,927

(22) PCT Filed: Sep. 29, 2011

(86) PCT No.: PCT/US2011/053841
§ 371 (c)(1),
(2), (4) Date: Jun. 5, 2012

(87) PCT Pub. No.: WO2012/050946
PCT Pub. Date: Apr. 19, 2012

(65) Prior Publication Data
US 2013/0179960 A1  Jul. 11, 2013

Related U.S. Application Data

(60) Provisional application No. 61/387,813, filed on Sep. 29, 2010.

(51) Int. Cl.
*G06F 15/16* (2006.01)
*H04L 9/32* (2006.01)

(52) U.S. Cl.
USPC .......... 726/9; 726/7; 726/19; 726/20; 726/21; 726/28; 713/172

(58) Field of Classification Search
USPC ................... 726/7, 9, 19, 20, 21, 28; 713/172
See application file for complete search history.

(56) References Cited

U.S. PATENT DOCUMENTS

| | | | |
|---|---|---|---|
| 5,781,229 A | 7/1998 | Zediker et al. | |
| 6,215,498 B1 | 4/2001 | Filo et al. | |
| 2005/0257137 A1 | 11/2005 | Weber et al. | |
| 2006/0075356 A1 | 4/2006 | Faulkner et al. | |
| 2006/0214907 A1 | 9/2006 | Devos et al. | |
| 2006/0274046 A1 | 12/2006 | Hillis et al. | |
| 2007/0129927 A1 | 6/2007 | Chussil et al. | |
| 2008/0168139 A1 | 7/2008 | Junuzovic et al. | |
| 2010/0005524 A1 | 1/2010 | Blythe et al. | |
| 2010/0079414 A1 | 4/2010 | Ferlitsch | |
| 2011/0314168 A1* | 12/2011 | Bathiche et al. | 709/228 |

* cited by examiner

*Primary Examiner* — Beemnet Dada
*Assistant Examiner* — Kalish Bell
(74) *Attorney, Agent, or Firm* — Sand & Sabolt; Daniel J. Long

(57) ABSTRACT

A system and method for allowing for distributed interaction in a computing scenario is presented. The system is powered by SandTable software. First and Second items are respectively displayed on interactive screens of first and second surface computers. A first token is configured to be placed on the interactive screen of one of the computers and that computers reads its credentials. The SandTable software determines a first access level of the first token based on the credentials of the first token when it is placed on the surface computer. The first surface computer displays an image of an add item symbol when the first token is authenticated as a valid token. The SandTable software is configured to detect when the add item symbol is selected and to generate a menu of new items. SandTable creates a new item based on the new item selected from the menu.

18 Claims, 9 Drawing Sheets

METHOD OF COLLABORATIVE COMPUTING

CROSS REFERENCE TO RELATED APPLICATIONS

This application is a National Stage Entry of PCT Application Serial No. PCT/US2011/053841 having an international application date of Sep. 29, 2011, which application claims priority from U.S. Provisional Application Ser. No. 61/387,813, filed Sep. 29, 2010; the disclosures of which are incorporated herein by reference.

BACKGROUND OF THE INVENTION

1. Field of Invention

The current invention relates generally to apparatus, systems and methods for collaborative networking. More particularly, the apparatus, systems and methods relate to collaborative networking involving different groups, teams and/or individuals. Specifically, the apparatus, systems and methods provide for providing a collaborative networking environment that authenticates and controls access to the environment by different groups, teams and/or individuals.

2. Description of Related Art

A fairly recent development in computing has been the development of collaborative networking. Collaborative networking allows people in different locations to access common computing equipment, resources and data. For example, employees of a business with locations in New York and San Francisco can join together with collaborative networking to conduct a meeting without needing to leave their respective locations. Software such as Microsoft Office SharePoint is available to allow each location to log into a meeting location on the network. The software can bring up a common screen at both locations to allow meeting members to communicate over the network, display documents, edit documents and conduct a meeting with everyone participating having real time access to common documents.

In more detail, Microsoft Office (MS) SharePoint is a web application platform developed by Microsoft and launched in 2001. Microsoft Office SharePoint is designed as a centralized replacement for multiple web applications and supports various combinations of enterprise website requirements. It is typically associated with web content management and document management systems.

MS SharePoint's multi-purpose platform allows for managing and provisioning of intranet portals, extranets and websites, document and file management, collaboration spaces, social networking tools, enterprise search, business intelligence tooling, process/information integration, and third-party developed solutions. MS SharePoint can also be used as a web application development platform.

MS SharePoint is capable of supporting multiple organizations on a single 'server farm'. Microsoft provides a SharePoint foundation system at no cost but sells premium editions with additional functionality, and also provides MS SharePoint as a cloud computing solution as part of Microsoft's Business Productivity Online Standard Suite (BPOS) and Office 365. The product is also sold as a cloud solution by local third-party vendors. SharePoint provides various methods for customization and configuration of web areas, all of which have granular governance configurations. Beyond basic page-editing, file-storing and custom design ('branding') abilities, one of the more prevalent forms of configuration is the ability to install third-party customizations called 'web parts' (i.e., portlets/widgets/gadgets).

SharePoint 2010 provides collaboration tools that are used to share ideas, find people and expertise, and locate business information. With SharePoint 2010 "communities" features, people can work together using a full set of collaboration tools—from wikis to workflows and team sites to tagging. A single, flexible platform makes it easy to manage these tools and design the right collaborative experiences for different business needs.

MS SharePoint provides a variety of tools for creating different networks sites with a single infrastructure that simplifies site management. For example, a team site can be created for colleagues, an extranet site can be created for partners or MS SharePoint can be used to create an Internet site for customers. MS SharePoint allows the sharing and publishing of information using one familiar system. Even though there has been some collaborative networking software developed, there still exists a need for improved collaborative networking software and systems.

SUMMARY OF THE INVENTION

SandTable is a touch-enabled planning and war gaming tool. It is scalable, customizable, and networked to allow visualization in planning, education, and gaming environments. It is a multi-participant, collaborative tool with an intuitive natural user interface. In some configurations, users of SandTable can interact with it through Microsoft Surface Multi-Touch Tables located at different geographic locations. SandTable software can run on these commercial off-the-shelf Microsoft Surface touch-tables.

SandTable employs an intuitive touch-enabled version of Bing Maps, overlaid with icons, graphics, and user-created inkings. SandTable enables users to plan together, simultaneously and interactively. With this technology, groups can visually plan across time and space. Groups can observe the actions of others, respond to those actions, and view the response of others to the group's new plans and actions. SandTable is a communication enhancing technology.

SandTable provides a multi-touch, shared visual experience among users in a networked system. This collaborative and networked capability, however, is also useful to planners, who operate in dispersed environments yet need the ability to communicate effectively across this time and space divide.

For example, in war gaming there may be white, red, blue and green teams. The team of white garners can directly inform the entire gaming audience. A touch-table can identify any team token, to include the white team. The white team has the ability to edit, generate and task units and events and add overlays and documents to all teams' folders. The instant this information is saved it automatically becomes available to all players. Depending on the player team, the bit-tagged tokens will allow teams to access their team specific information, without giving the red the ability to edit the blue team units—only the white team has this power.

When blue or red players move their units or give their units new tasking orders, the other team and its cells can view this change in position and tasking. This means that the red, blue, green and white teams can communicate across time and space without having to break planning and go into large break-out rooms to discuss their operations and planning guidance. Commanders can literally just drop the information into team and cells' folders. Additionally, collaborative White Boarding and token activation means that multiple groups, such as USAID, Department of State and Department of Defense, can come together around a single table, drop their tokens and white board together. The benefit of this is that the SandTable can recognize the white boarding team and assign colors based on the token of the team, so DOS, DOD, and USAID can have three different color markers on the same white board. Each team knows whose idea is whose, and once saved can be disseminated to other players.

For planners, the same design capabilities can be leveraged for their planning needs. With map-based functions providing the matte of the SandTable, planners can generate overlays and white board potential avenues of approach and key terrain features that may influence major operations. Planners can save these overlays and inkings in SharePoint by simply touching "Save" on the inking map or overlay map. With the inkings and overlays in SharePoint, any other planner or group of planners can access these plans and add their input. Additionally, the ability to place tokens down can differentiate different planning elements, from logistics to infantry unit planners, and enable these groups to add units to the map, task the units, and share those units and their tasking instantaneously through SharePoint to other tables connected to their SandTable network. In summary, SandTable technology gives users a shared planning experience across time and space. Each surface computer's connection to a SharePoint type of network can ensure that planners and war garners operating in a dispersed fashion have a shared visualization of information for improved integration and coordination of information between individuals and teams. The interactive surface computer table design encourages face-to-face collaboration, improving communication and teamwork in planning and war gaming environments. The SandTable's touch enabled functions are easy for users to learn in a matter of minutes. Users do not need to attend long training sessions before they are capable of utilizing the table.

The preferred embodiment of the invention includes a system for allowing for distributed interaction in a computing scenario. The system is powered by SandTable software at least partially executing on a processor.

First and Second items are respectively displayed on interactive screens of first and second surface computers. A first token is configured to be placed on the interactive screen of the first surface computer or the second surface computer. The first surface computer or the second computer is configured to read first credentials of the first token when first token is placed on the interactive screen. The SandTable software determines a first access level of the first token based on the credentials of the first token when it is placed on the surface computer. The first surface computer displays an image of an add item symbol when the first token is authenticated as a valid token. The first surface computer can display the image of an add unit symbol adjacent the first token. The SandTable software is configured to detect when the add item symbol is activated and to generate a menu of new items based on the access level when the add item symbol is activated. The SandTable software is configured to create a new item based on a new item selected from the menu.

In the preferred embodiment, graphical components displayed on the interactive screen of the first surface computer and the interactive screen of the second surface computer can be displayed in content explorer mode or scenario mode. In content explorer mode, a user of the first surface computer can view documents, edit documents, highlight documents, view images and view video data. In scenario mode, the user of the first surface computer can browse the computing scenario as well as add items to the computing scenario. An administrator user can upload file contents to a database associated with the first processor when the SandTable software determines that the administrator user is an authenticated administrator. Items include: events that describe what is occurring in the computing scenario, overlays that add images to the computing scenario, units that create actions or represent locations of facilities and organizations, and inks that are used to draw on the computing scenario.

The system can further include an administrative token. The administrative token can be placed on the interactive screen of the first surface computer. The first surface computer is configured to read the administrative credentials of the administrative token when the administrative token is placed on the interactive screen of the first surface computer. The SandTable software authenticates the administrative token as a valid administrator based on the credentials of the administrative token. The first surface computer can also be configured to display an image of an add event symbol adjacent the administrative token when the administrative token has been authenticated as a valid administrator. The SandTable software is configured to detect when the add event symbol is selected and to generate a menu of new events based on the access level when the add event symbol is selected. The system can include a second token that is configured to be placed on the interactive screen of the first surface computer or the second surface computer. The first surface computer or the second computer is configured to read first credentials of the second token when the second token is placed on the interactive screen. The SandTable software determines a second access level of the second token based on the credentials of the second token.

The interactive screen of the first surface computer or the second surface computer is configured to detect a request to ink associated with the second token and to provide a first ink color associated with the second token. The interactive screen of the first surface computer is configured to detect a request to ink associated with the first token and to provide a second ink color associated with the first token that is a different color than the first color.

Another configuration of the preferred embodiment is a method of collaborative computing. The method begins by simultaneously displaying a computer generated scenario including items on displays of first surface computer and a second surface computer at a location remote to the first surface computer. The first surface computer and the second surface computer have interactive touch-sensitive screens that may be multi-touch sensitive. A first physical token placed on the first surface computer by a first person (participant) is identified. The first physical token at least in part identifies credentials of the first person. The first person is authenticated based, at least in part, on the credentials of the first person to determine an authorization of the first person. The first person is allowed to edit items as permitted by the authorization of the first person.

Similar to the first token, a second physical token that has been placed on the second surface computer by a second person is identified. The second physical token at least in part identifies credentials of the second person. The second person is authenticated based, at least in part, on the credentials of the second person to determine an authorization of the second person that is different than the authorization of the first person. The second person is allowed to edit one or more items as permitted by the authorization of the second person. The authorization of the second person permits the second person to edit at least one item that the authorization of the first person does not permit the first person to edit.

Participants interacting with the scenario with the proper credentials can add units to the scenario. When a token is placed on a surface computer, an add unit symbol is displayed adjacent the first physical token. A participant can touch the add unit symbol and the surface computer will detect the touch of the add unit symbol by the first person. Upon detecting this, the surface computer will allow the participant to add a new unit to the computer generated scenario based, at least in part, on the authorization of the first person.

A participant can also add ink (e.g., draw/write) to documents in the computer scenario. A surface computer can display a first add ink symbol near the first physical token. The participant can click this symbol and the computer will detect this request to add ink. The surface computer will then add ink as directed to by the participant through the interactive touch-sensitive screen of the first surface computer. Of course, the authorization of the participant may be checked to determine whether or not they have credentials for inking. In the preferred embodiment, determination of the ink color can be made based on the token placed on the surface computer.

In other configurations of the preferred embodiment, when processing an inking request a determination of a position of a finger with respect to an edge of the first surface computer and the first physical token can be made. The color used for this inking request can be made based on the position of the finger. Alternatively, the color can be chosen based on the angle a finger makes with respect to an edge of the surface computer.

BRIEF DESCRIPTION OF SEVERAL VIEWS OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

The term "surface computer" used within this specification is meant to include any computer that is built into a table such as any table computer with a touch screen surface as well as wall mounted computers with touch screen surfaces.

The preferred embodiment of the invention is a system referred to hereafter as SandTable that includes a general purpose, multi-touch software application written to enhance group collaboration for various planning, gaming, and educational purposes. SandTable can implement a variety of computer generated scenarios across a distributed network allowing participants at different geographical location to collaboratively participate in and/or alter (edit) the scenario. For example, one computer generated scenario could map out geographic locations of Federal Express (FedEx) centers, with units on the map that represent FedEx vehicles or trucks. Participants located at remote locations could then access the computer scenario to view a geographic representation of the FedEx centers, trucks and real time data of parcels that are to be delivered. The remote participants could, with the use of SandTable, collaboratively interact to schedule trucks and other resources to be sure the packages are efficiently and timely delivered.

In another example, the military could use SandTable software to play war games. Again, a map can be displayed that shows the geographical locations of friendly and/or enemy units. Units can be such items as troops, trucks, tanks and the like. Game players could move units, add units they have permission to add and create events while the game is being played. Players can create events including firing weapons, creating alliances, firing missiles, and the like within the collaborative war game computer generated scenario.

Some of the benefits of SandTable include shared visualization for planning enhances integration and improved coordination. Enhanced face-to-face collaboration among users of SandTable sharing a surface computer and the like improves communication and team work. Minimum user training enables rapid deployment. SandTable leverages commercial off-the-shelf technologies, reducing costs.

Figure 1:
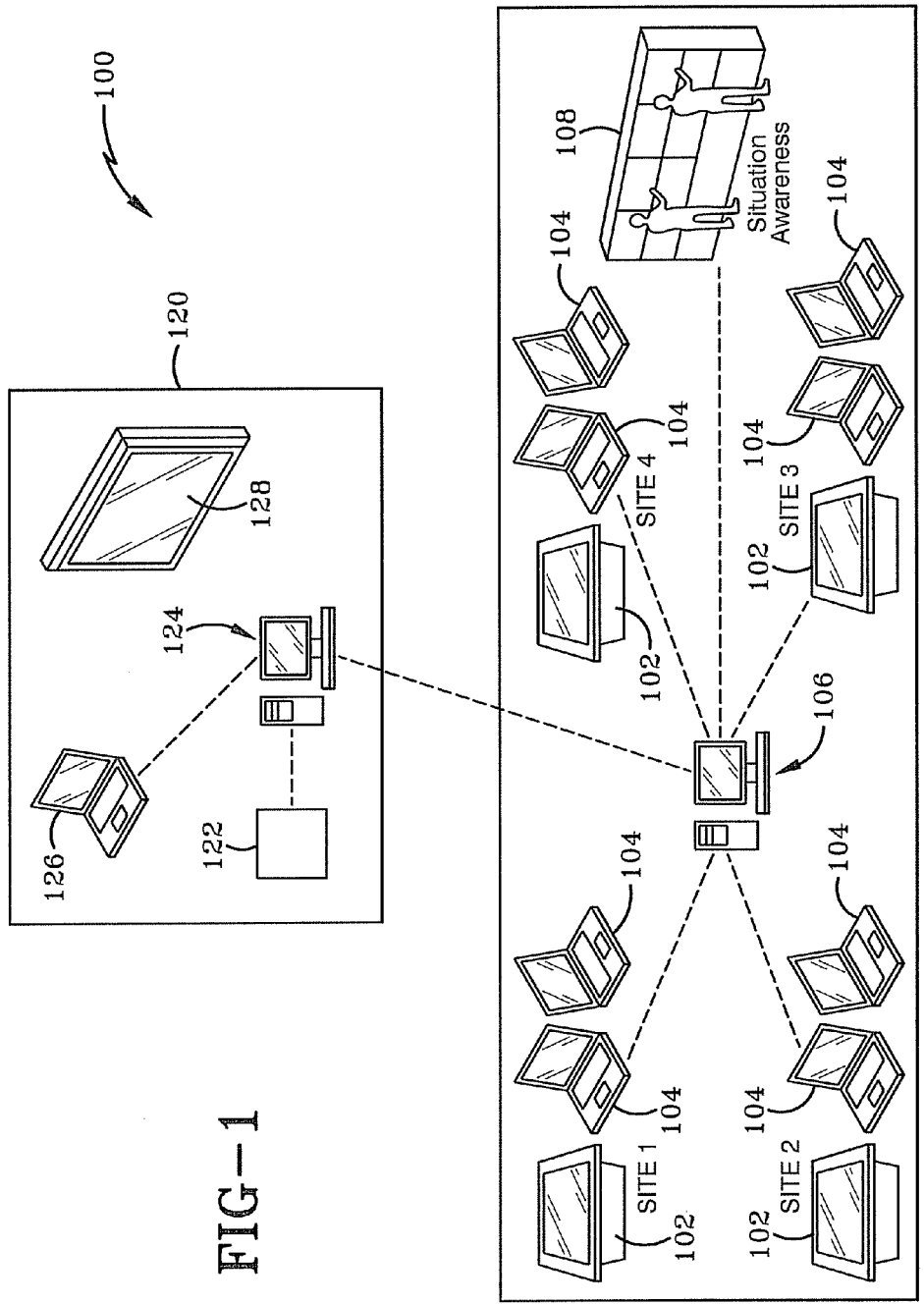
FIG. 1 illustrates a preferred embodiment of network implementing a collaborative computing environment for creating a computer scenario.

FIG. 1 illustrates a system 100 implemented with SandTable including some of the hardware and networking components of preferred embodiment. The system 100 includes an administrator cell 120 that includes a server controller 124. The administrator cell 120 controls a database 122. The database may be any suitable database such as Microsoft's SharePoint 2010 database, for example. The administrator cell 120 uses the SandTable software as well as the backend database to create game scenarios for the end users. The administration cell 120 can also include a laptop 126 to provide an additional way of administering the system 100 as well as other monitors 128 for monitoring the system 100.

The system 100 includes two or more sites 1-4. The sites 1-4 are client cells wherein the participants collaboratively participate in the computer. Participants at each side can access the SandTable software through surface computers 102 by using multi-touch commands, laptop computers 104 or interact with a scenario other ways as understood by those of ordinary skill in the art. One or more of the different sites 104 can be networked together through a server 106 or router that connects them to the server controller 124 of the administrator cell 120. Participants or other observers can monitor the scenario on other monitors 108 connected to the server 106. Of course, those with ordinary skill in the art will appreciate that collaborative computing using SandTable software can be implemented in other networks, network configurations, and other hardware than what is shown in FIG. 1.

Figure 2:
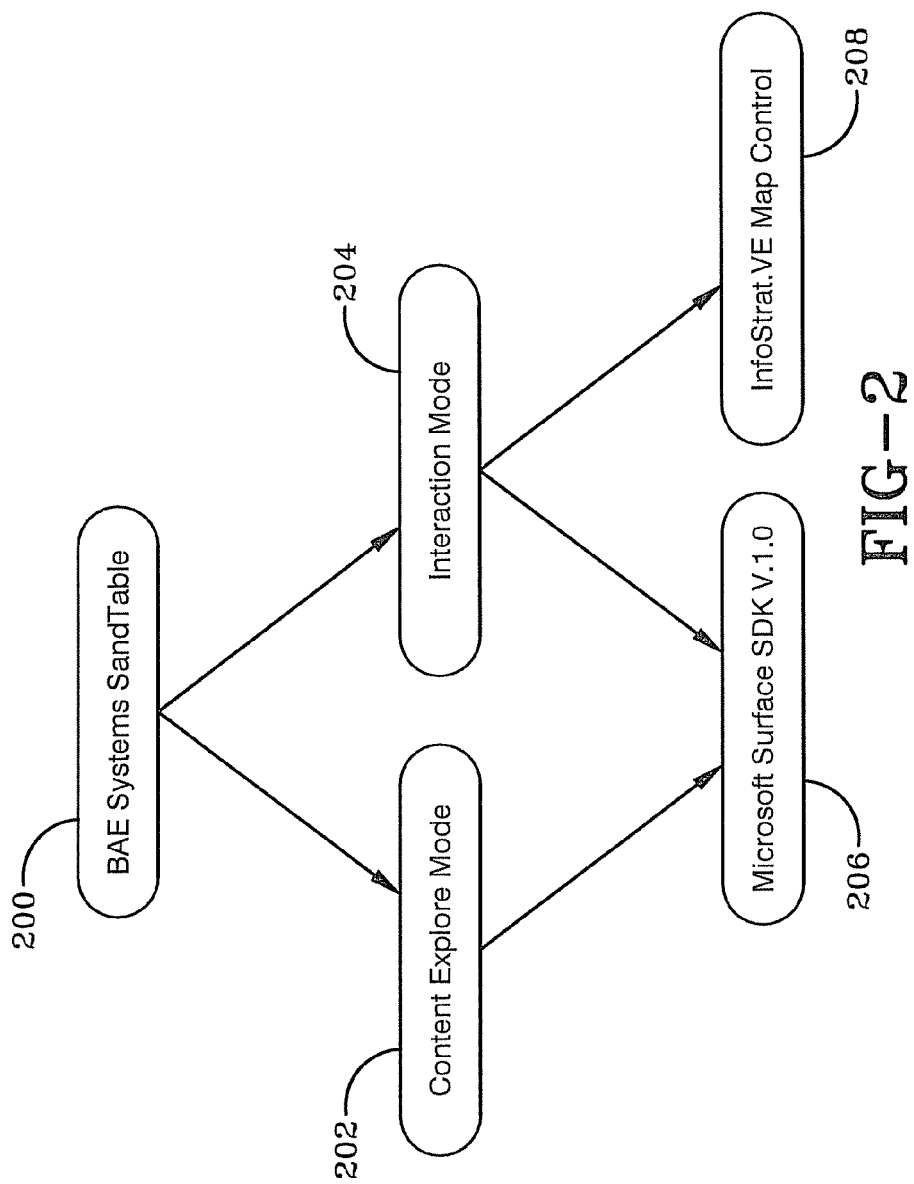
FIG. 2 illustrates software components implementing a collaborative computing environment for creating a computer scenario.

FIG. 2 illustrates the two primary modes that the SandTable software 200 operates in and how it interacts with other standard software. In the preferred embodiment, the SandTable software 200 can operate either in "content explorer mode" 202 or in "scenario mode" 204. Content explorer mode and scenario mode are descript names of what mode the SandTable software 200 is operating in. For example, in the FedEx example discussed above scenario mode 204 may be more accurately referred to as "map mode" because maps may be of primary interest and in the War Game scenario discussed above scenario mode 204 may be more accurately referred to as "game mode". Content explorer mode 202 dynamically loads file contents from a collaborative software such as SharePoint to allow participants to view, edit, and highlight documents, videos and images. In content explorer mode 202, administrative users can upload file contents to the SharePoint database via the server or client laptops.

The scenario mode 204 is used to dynamically create a specific scenario. scenario mode 204 allows users to browse the game scenario and add items to it. Items include events, overlays, units, and inks. The user can update existing items, and/or move units based on their team credentials. Units are items that are used to create actions and represent locations of organizations or facilities. As previously mentioned, units can be vehicles such as trucks in a FedEx scenario or tanks, trucks, other military equipment and facilities when in a war game type of scenario.

Events are dialogue boxes on the screen that describe what is happening in a scenario. For example, dialog boxes can describe what is happening to a unit or describe an event in more detail. Overlays are used to enhance game description by adding images on top of the scenario. For example, in a FedEx or war game type of environment, specific maps can be overlaid on images of the scenario to precisely identify geographic features or unit locations within the maps. Specifically, while in the scenario mode 204, the SandTable software can interact with software to access advanced mapping capabilities so that accurate and detail map overlays can be added to a computer generated scenario. For example, InfoStrat Inc.'s VE Map Control open source software can be accessed to implement mapping functions. Both Microsoft Surface SDK 206 and InfoStrat VE Map Control 208 are their own independent frameworks that are separate from BAE System Inc.'s SandTable source code. The Microsoft and InfoStrat source codes do not need to be modified to work with SandTable software.

As shown in FIG. 2, while in content explorer mode 202 or scenario mode 204, the SandTable software in the preferred embodiment can interact with a software developers kit (SDK) to develop multi-touch commands for the surface computers 102 of FIG. 1. For example, Microsoft Surface SDK V1.0 may be use or another SDC can be used.

Also, as discussed further below, the scenario mode 204 also provides functionality such as user team authentication and team item filtering. Users can interact with and modify the game scenario and items when they present the correct credentials to the SandTable.

Figure 3:
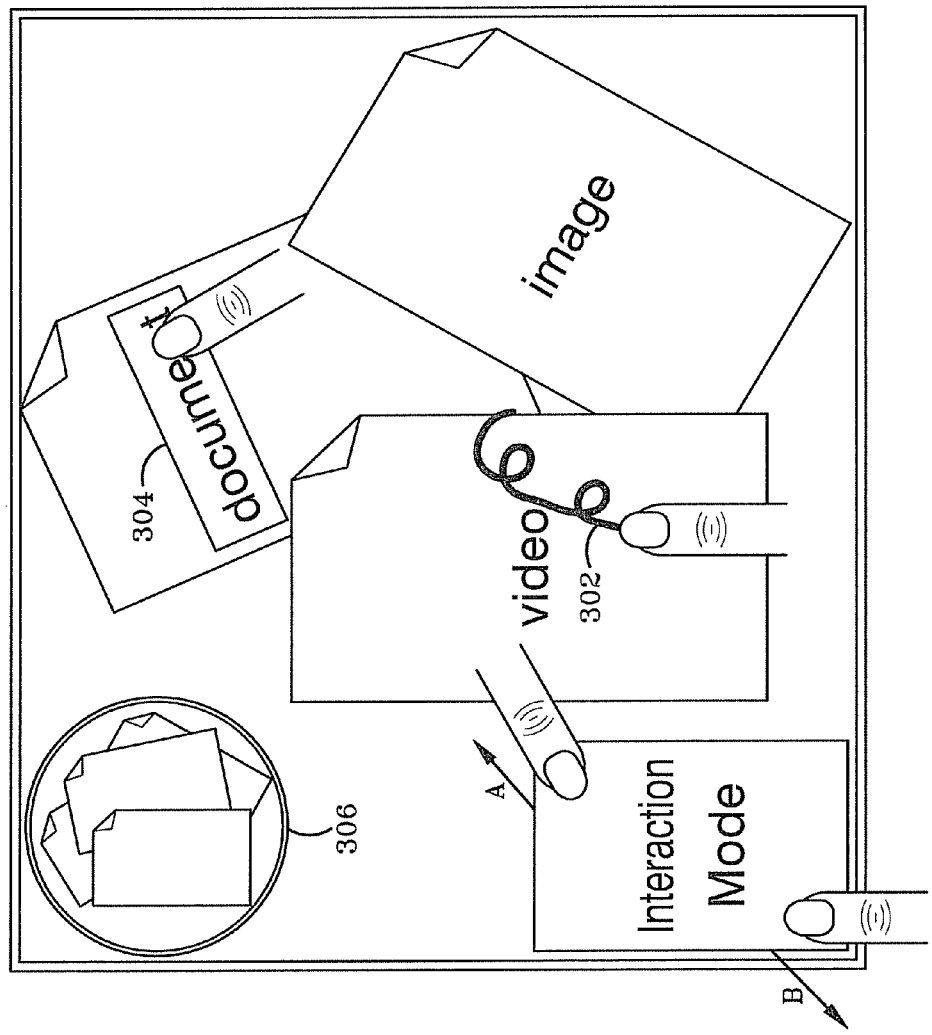
FIG. 3 illustrates the interaction of documents in content explorer mode of a collaborative computing environment for creating a computer scenario.

FIG. 3 illustrates some examples of the ways a participant can interact with SandTable through a surface computer 102 in content explorer mode 202. A participant can explore and open a document by sliding two fingers apart as shown by arrows A, B. A participant can edit a content explorer item by inking with his finger 302. Inking is similar to drawing with a finger and is discussed later. Inking can be thought of as collaborative White Board functionality. A participant can highlight 304 content explorer item text with his finger. A participant can browse content explorer items from the content explorer bucket 306.

Figure 4:
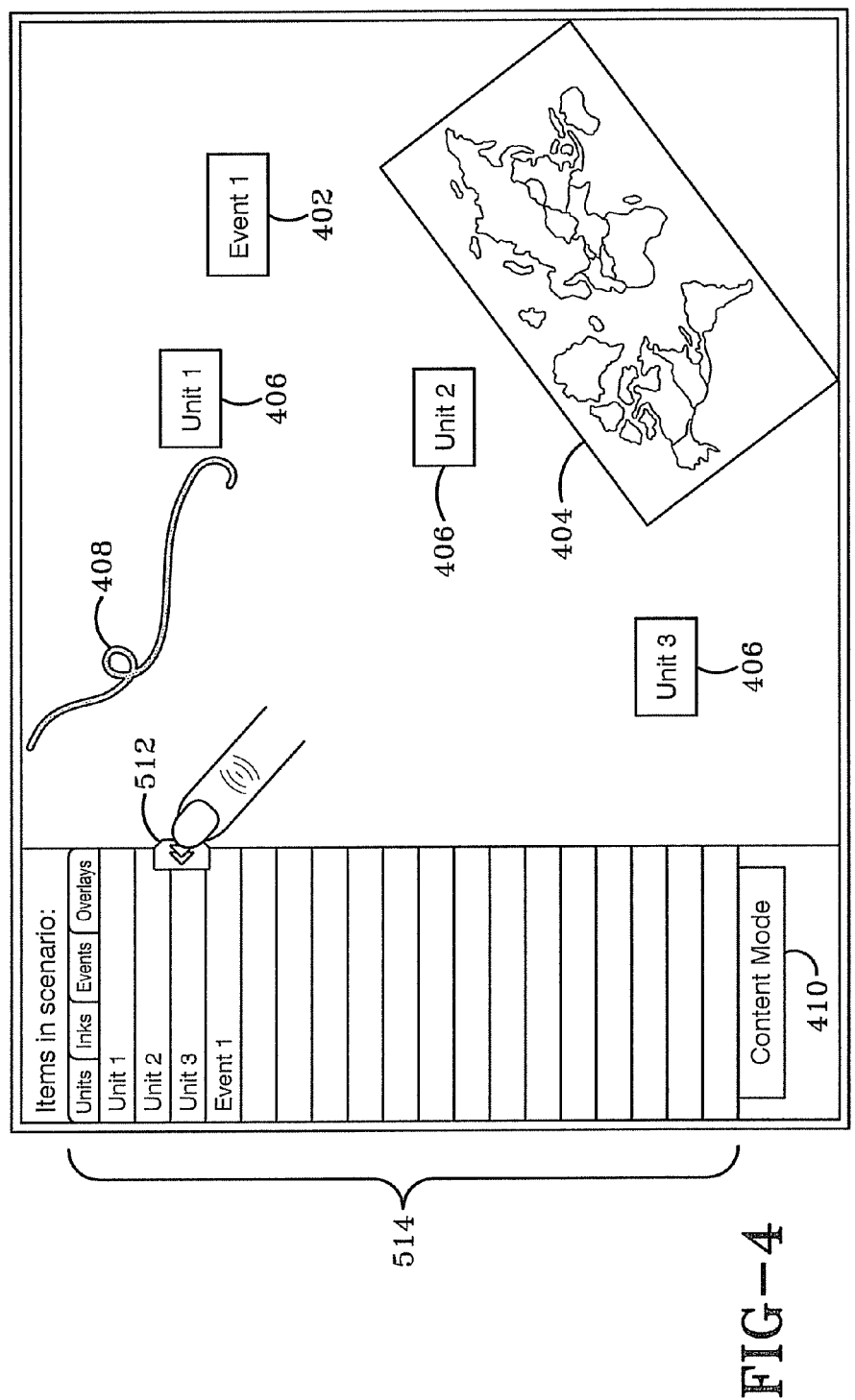
FIG. 4 illustrates the components in the interaction mode of a collaborative computing environment for creating a computer scenario.

FIG. 4 illustrates some of the graphic components and interactive devices use in interaction mode 204 to interact within a scenario. An event 402 is a dialog box that all participants can view and read, but only an administrative user may alter. An overlay 404 is an image that is attached onto the game scenario (in this case a world map). A unit 406 is created by users by clicking on add unit on the token (the add unit symbol of a token is discussed below). Participants can also edit the type and details/actions of the unit 406 for their specific team. Only administrative users can edit all the units. Participants can sketch ink 408 on the scenario. A "content mode" button 410 allows a participant to return to content explorer mode 202 from scenario mode 204. A "minimize items" bar 512 minimizes the items bar 414 while in scenario mode 204. An items bar 514 allows quick access to events, overlays, units and inks.

Figure 5:
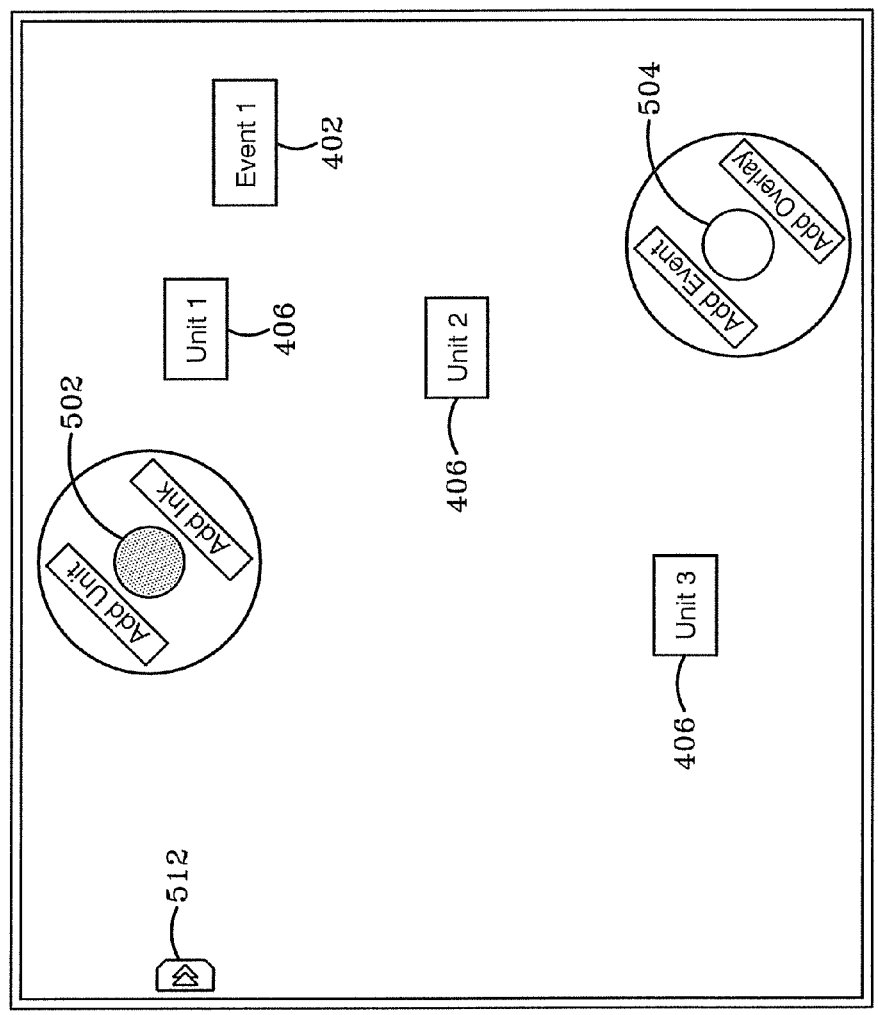
FIG. 5 illustrates tokens placed on top of a surface computer of a collaborative computing environment for creating a computer scenario.

FIG. 5 illustrates some of the uses of physical tokens 502, 504 on a surface computer within a scenario. In general, a token is a chip that has a byte tag attached to its lower surface. SandTable interacts with physical tokens 502, 504 to identify teams and authenticate different participants to filter scenario items. In the preferred embodiment, there are two types of physical tokens: user (participant) tokens and administrative tokens.

There can be multiple user tokens 502 per computer scenario. The user tokens are used for filtering purposes and allow users to edit or add their own units 406 and inks 408. In some scenarios, participants are only allowed to modify their own scenario items.

In the preferred embodiment, there is only one administrative token 504 per scenario. The administrative token 504 allows the administrator to add events 402 and overlays 404. The administrator is allowed to modify all scenario items, and is capable of viewing all items in a scenario.

Figure 6:
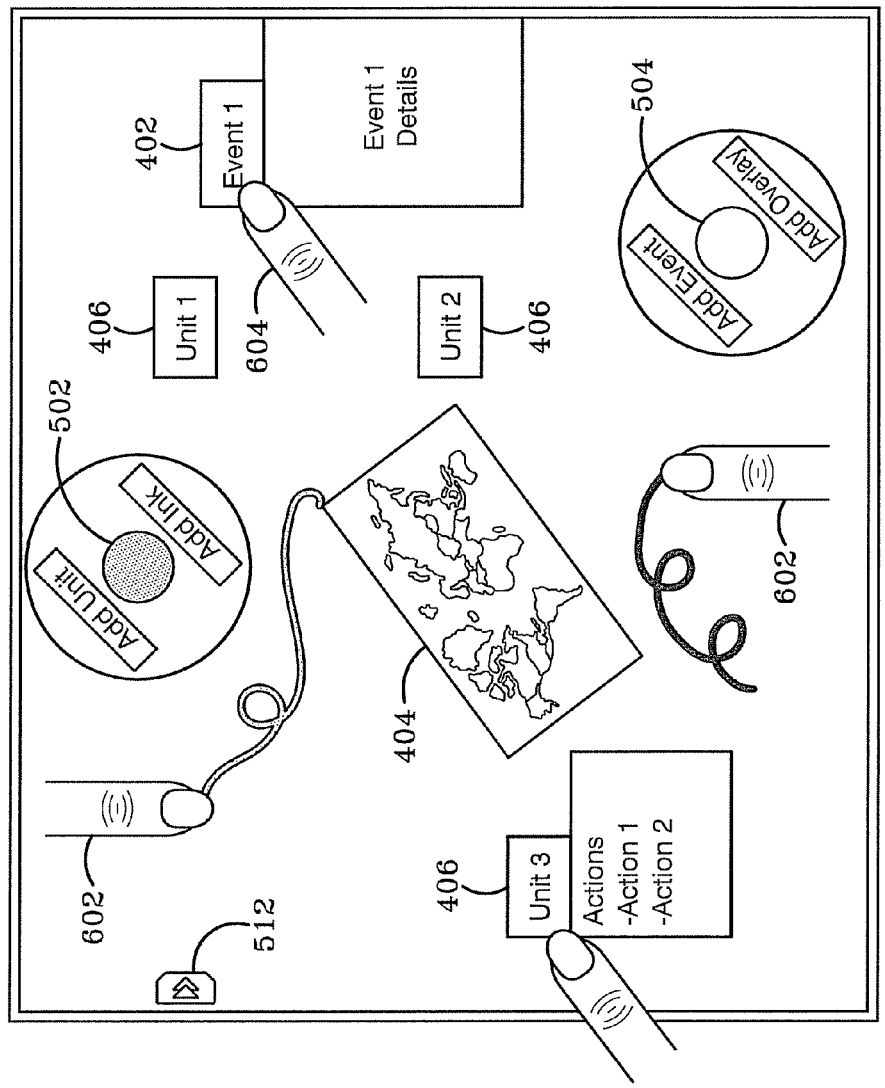
FIG. 6 illustrates multiple users interacting on the surface computer of a collaborative computing environment for creating a computer scenario.

FIG. 6 illustrates multiple participants accessing a scenario at a surface computer at the same time. As shown, multiple participants 602 may ink at the same time. The ink color is based on the token color next to the finger. If no token is present, a grey ink is used. Participants can expand events 402 with finger touch. Similarly, a unit 406 can be expanded with a finger touch. Participants can edit the actions in the unit 406.

Figure 7:
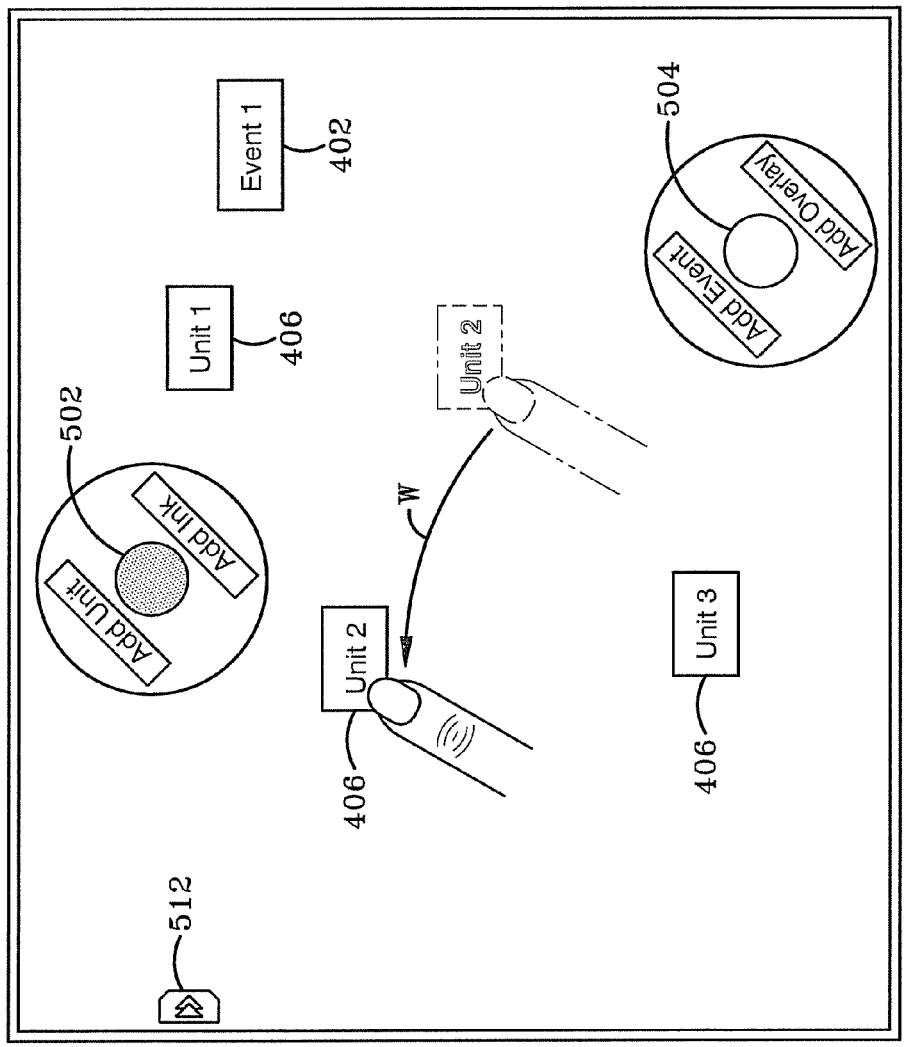
FIG. 7 illustrates a user moving a unit on the surface computer of a collaborative computing environment for creating a computer scenario.

FIG. 7 illustrates how participants can move units 406 by dragging them in the direction of arrow W and dropping them in the interactive scenario panel.

Figure 8:
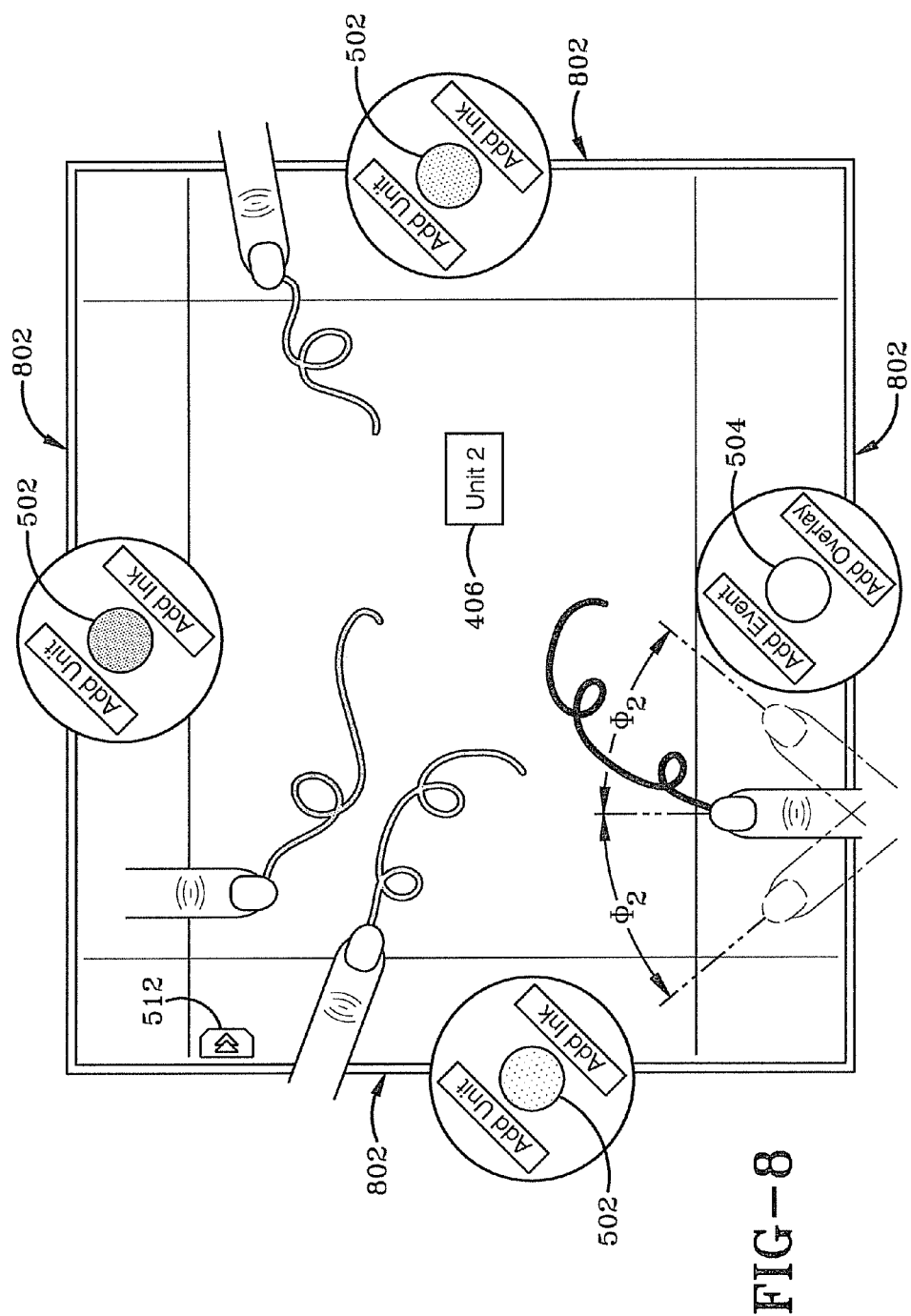
FIG. 8 illustrates using the placement of a finger for selecting an inking color for inking on the surface computer of a collaborative computing environment for creating a computer scenario.

FIG. 8 illustrates how interactive mode 204 provides for advanced inking. In the preferred embodiment, two or more different participants may be inking on a scenario at the same time. The ink color is determined by the direction of a participant's finger in relation to the token 502, 504 next to him. In one configuration of the preferred embodiment, tokens 502, 504 need be placed on the edges of the boarder 802 in order to work. Tokens 502, 504 are placed near the edges of the table. Participants stand at the side of the table, facing the center of the table. The participant's finger points forward (within 45 degrees of true north, as shown by $\phi_1$ and $\phi_2$). The token location and finger angle determine the ink color to be used.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 9:
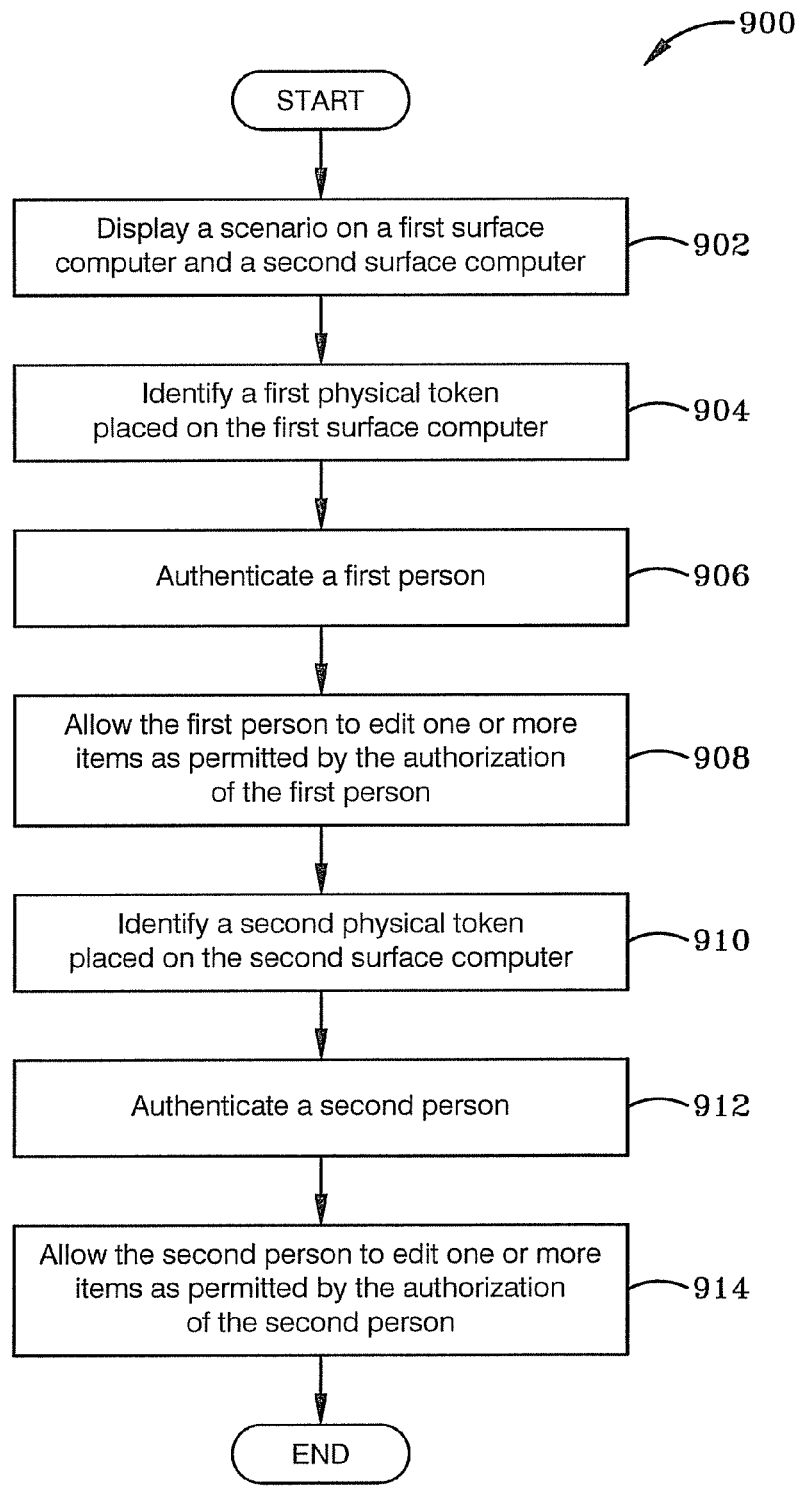
FIG. 9 illustrates an embodiment of a method for collaborative computing and interacting with a computer scenario.

FIG. 9 illustrates a method 900 of collaborative computing. The method 900 may be used in the FedEx type of scenario (environment) discussed above, a war game scenario, or another type of scenario. The method 900 begins by simultaneously displaying a computer generated scenario, at 902, including a plurality of items on a first surface computer and a second surface computer at a location remote to the first surface computer. The first surface computer and the second surface computer have interactive touch-sensitive screens that may be multi-touch sensitive. A first physical token placed on the first surface computer by a first person is identified, at 904. The first physical token at least in part identifies credentials of the first person. The first person is authenticated, at 906, based, at least in part, on the credentials of the first person to determine an authorization of the first person. The first person is allowed to edit items, at 908, as permitted by the authorization of the first person.

Similar to the first token, a second physical that has been token placed on the second surface computer by a second person is identified, at 910. The second physical token at least in part identifies credentials of the second person. The second person is authenticated, at 912, based, at least in part, on the credentials of the second person to determine an authorization of the second person that is different than the authorization of the first person. The second person is allowed to edit one or more items, at 914, as permitted by the authorization of the second person. The authorization of the second person permits the second person to edit at least one item that the authorization of the first person does not permit the first person to edit.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the preferred embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in the preferred embodiment" does not necessarily refer to the same embodiment, though it may.

What is claimed is:

1. A method of collaborative computing comprising:
    displaying a computer generated scenario including a plurality of items on a first surface computer and a second surface computer at a location remote to the first surface computer, wherein the first surface computer and the second surface computer have interactive touch-sensitive screens;
    identifying a first physical token placed on the first surface computer by a first person, wherein the first physical token at least in part identifies credentials of the first person;
    authenticating the first person based on the credentials of the first person to determine an authorization of the first person;
    allowing the first person to edit one or more of the items as permitted by the authorization of the first person;
    identifying a second physical token placed on the second surface computer by a second person, wherein the second physical token at least in part identifies credentials of the second person;
    authenticating the second person based on the credentials of the second person to determine an authorization of the second person that is different than the authorization of the first person;
    allowing the second person to edit one or more of the items as permitted by the authorization of the second person, wherein the authorization of the second person permits the second person to edit at least one item that the authorization of the first person does not permit the first person to edit;
    displaying a first add ink symbol near the first physical token;
    detecting a request to add ink through the first add ink symbol; and
    inking a first item based on the authorization of the first person and as directed by the first person through the interactive touch-sensitive screen of the first surface computer.

2. The method of collaborative computing of claim 1 wherein the items include units that are computer graphical symbols that are used to create actions in the scenario or to represent a location of an organization or the location of a facility.

3. The method of collaborative computing of claim 1 further comprising:
    display playing an add unit symbol adjacent the first physical token;
    detecting a click of the add unit symbol by the first person;
    allowing the first person to add a new unit to the computer generated scenario based, at least in part, on the authorization of the first person.

4. The method of collaborative computing of claim 1 further comprising:
    determining a first ink color based on the first token; and
    inking the at least first one item with the first ink color.

5. The method of collaborative computing of claim 1 further comprising:
    displaying a second add ink symbol near the second physical token;
    detecting a request to add ink through the second add ink symbol; and
    inking a second item based on the authorization of the second person and as directed by the second person through the interactive touch-sensitive screen of the second surface computer.

6. The method of collaborative computing of claim 5 further comprising:
   determining a second ink color based on the second token, wherein the first ink color and the second ink color are different colors; and
   inking at least one second item with the second ink color.

7. The method of collaborative computing of claim 1 further comprising:
   detecting a request to add ink through the interactive touch-sensitive screen of a first surface computer;
   determining a position of a finger with respect to an edge of the first surface computer and the first physical token;
   determining a color based on the position of the finger and inking an item based on commands received from the interactive touch-sensitive screen of the first surface computer.

8. The method of collaborative computing of claim 1 further comprising:
   detecting a request to add ink through an interactive touch-sensitive screen of a third surface computer; and
   inking an item with a gray ink when no physical token is located on the third surface computer, wherein the inking is directed by commands received from the interactive touch-sensitive screen of the third surface computer.

9. The method of collaborative computing of claim 1 further comprising:
   detecting a request to add ink through the interactive touch-sensitive screen of the first surface computer;
   determining an angle of a finger with respect to an edge of the first surface computer and the first physical token; and
   inking an item based on commands received from the interactive touch-sensitive screen of the first surface computer, wherein a color of the inking is based on the angle of the finger.

10. A system allowing for distributed interaction in a computing scenario comprising:
    a SandTable software at least partially executing on a first processor;
    a first surface computer;
    a first item displayed on an interactive screen of the first surface computer;
    a second surface computer displaying a second item on an interactive screen of the second surface computer;
    a first token that is configured to be placed on the interactive screen of the first surface computer, wherein the first surface computer is configured to read first credentials of the first token when the first token is placed on the interactive screen,
    wherein the SandTable software determines a first access level of the first token based on the credentials of the first token;
    wherein the first surface computer displays an image of an add item symbol when the first token is authenticated, wherein the SandTable software is configured to detect when the add item symbol is selected and to generate a menu of new items based on the access level when the add item symbol is selected, and wherein the SandTable software is configured to create a new item based on a new item selected from the menu; and
    wherein the interactive screen of the first surface computer or the second surface computer is configured to detect a request to ink associated with a second token and to provide a first ink color associated with the second token.

11. The system allowing for distributed interaction in a computing scenario of claim 10 wherein graphical components displayed on the interactive screen of the first surface computer and the interactive screen of the second surface computer can be displayed in content explorer mode or scenario mode, and wherein in content explorer mode a user of the first surface computer can view documents, edit documents, highlight documents, view images and view video data, wherein in scenario mode the user of the first surface computer can browse the computing scenario as well as add items to the computing scenario, and wherein an administrator user can upload file contents to a database associated with the first processor when the SandTable software determines the administrator user is an authenticated administrator.

12. The system allowing for distributed interaction in a computing scenario of claim 11 wherein items include: events that describe what is occurring in the computing scenario, overlays that add images to the computing scenario, units that create actions or represent locations of facilities and organizations, and inks that are used to draw on the computing scenario.

13. The system allowing for distributed interaction in a computing scenario of claim 12 further comprising:
    an administrative token that is configured to be placed on the interactive screen of the first surface computer, wherein the first surface computer is configured to read administrative credentials of the administrative token when the administrative token is placed on the interactive screen of the first surface computer, wherein the SandTable software authenticates the administrative token as a valid administrator based on the credentials of the administrative token.

14. The system allowing for distributed interaction in a computing scenario of claim 13 wherein the first surface computer is configured to display image of an add event symbol adjacent the administrative token when the administrative token has been authenticated as a valid administrator.

15. The system allowing for distributed interaction in a computing scenario of claim 10 wherein the SandTable software is configured to detect when the add event symbol is activated and to generate a menu of new events based on the access level when the add event symbol is activated.

16. The system allowing for distributed interaction in a computing scenario of claim 10 further comprising:
    the second token is configured to be placed on the interactive screen of the first surface computer or the second surface computer, wherein the first surface computer or the second surface computer is configured to read first credentials of the second token when the second token is placed on the interactive screen, wherein the SandTable software determines a second access level of the second token based on the credentials of the second token.

17. The system allowing for distributed interaction in a computing scenario of claim 10 wherein the interactive screen of the first surface computer or the second surface computer is configured to detect a request to ink associated with the first token and to provide a second ink color associated with the first token that is a different color than the first ink color.

18. The system allowing for distributed interaction in a computing scenario of claim 10 wherein the first surface computer displays the image of an add unit symbol adjacent the first token.

* * * * *